(12) United States Patent
Davidson et al.

(10) Patent No.: US 11,383,317 B2
(45) Date of Patent: Jul. 12, 2022

(54) METHOD AND APPARATUS FOR WELDING WITH SHORT CLEARING PREDICTION

(71) Applicant: Illinois Tool Works Inc., Glenview, IL (US)

(72) Inventors: Robert R. Davidson, New London, WI (US); Richard M. Hutchison, Iola, WI (US); James L. Uecker, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 583 days.

(21) Appl. No.: 16/363,584

(22) Filed: Mar. 25, 2019

(65) Prior Publication Data

US 2019/0217412 A1    Jul. 18, 2019

Related U.S. Application Data

(62) Division of application No. 12/945,451, filed on Nov. 12, 2010, now Pat. No. 10,239,146.

(60) Provisional application No. 61/303,735, filed on Feb. 12, 2010.

(51) Int. Cl.
*B23K 9/095* (2006.01)

(52) U.S. Cl.
CPC ................... *B23K 9/0953* (2013.01)

(58) Field of Classification Search
CPC ..... B23K 9/0953; B23K 9/095; B23K 9/0956

USPC ........... 219/130.21, 130.01, 130.31, 130.33, 219/130.4, 130.5, 130.51
See application file for complete search history.

(56) References Cited

U.S. PATENT DOCUMENTS

| | | | |
|---|---|---|---|
| 4,717,807 A | 1/1988 | Parks et al. | |
| 6,002,104 A | 12/1999 | Hsu | |
| 6,248,976 B1 | 6/2001 | Blankenship | |
| 6,326,591 B1 | 12/2001 | Hutchison et al. | |
| 6,995,338 B2 * | 2/2006 | Hutchison | B23K 9/1062 219/130.21 |
| 8,946,596 B2 * | 2/2015 | Peters | B23K 9/091 219/130.5 |
| 10,239,146 B2 | 3/2019 | Davidson et al. | |
| 2004/0188404 A1 | 9/2004 | Hutchison | |
| 2008/0006616 A1 | 1/2008 | Hutchison | |

FOREIGN PATENT DOCUMENTS

| | | |
|---|---|---|
| EP | 0133448 | 2/1985 |
| EP | 0273540 | 7/1988 |
| WO | PCT/2011/024331 | 2/2011 |
| WO | 2011/100415 A3 | 8/2011 |

* cited by examiner

*Primary Examiner* — Dana Ross
*Assistant Examiner* — James F Sims, III
(74) *Attorney, Agent, or Firm* — McAndrews, Held & Malloy, Ltd.

(57) ABSTRACT

A method and apparatus for providing welding-type power is disclosed and includes a short clearing prediction module that uses the second derivative with respect to time of the output voltage, or an error between a measured output voltage and an output voltage predicted using the first derivative with respect to time of the output voltage.

8 Claims, 4 Drawing Sheets

METHOD AND APPARATUS FOR WELDING WITH SHORT CLEARING PREDICTION

RELATED APPLICATIONS

This is a divisional of, and claims the benefit of the filing date of U.S. patent application Ser. No. 12/945,451, filed on Nov. 12, 2010 which issued as U.S. patent Ser. No. 10/239, 146 on Mar. 26, 2019.

FIELD OF THE INVENTION

The present invention relates generally to the art of welding-type power supplies. More specifically, it relates to a welding-type power supply with a controller that includes a module to predict the clearing of a short.

BACKGROUND OF THE INVENTION

There are many known welding-type systems used to provide a welding-type output or welding-type power for many known applications. Welding-type system, as used herein, includes any device capable of supplying welding, plasma cutting, and/or induction heating power including inverters, converters, choppers, resonant power supplies, quasi-resonant power supplies, etc., as well as control circuitry and other ancillary circuitry associated therewith. Welding-type output, as used herein, includes outputs suitable for welding, plasma or heating. Welding type power, as used herein, refers to welding, plasma or heating power.

Examples of prior art welding-type systems include those described in Method of Designing and Manufacturing Welding-Type Power Supplies, Albrecht, filed Sep. 19, 2001, application Ser. No. 09/956,401, which issued on Mar. 30, 2004 as U.S. Pat. No. 6,713,721; Pendant Control for a Welding-Type System, L. Thomas Hayes, filed Sep. 19, 2001, application Ser. No. 09/956,502, which issued on Oct. 28, 2003 as U.S. Pat. No. 6,639,182; Welding-Type Power Supply With A State-Based Controller, Holverson et al, filed Sep. 19, 2001, application Ser. No. 09/956,548, which issued on Jun. 8, 2004 as U.S. Pat. No. 6,747,247; Welding-Type System With Network And Multiple Level Messaging Between Components, Davidson et al., filed Sep. 19, 2001, application Ser. No. 09/957,707, which issued on Dec. 30, 2003 as U.S. Pat. No. 6,670,579; Welding-Type Power Supply With Boot Loader, L. Thomas Hayes, filed Sep. 19, 2001, application Ser. No. 09/956,405, which issued on Jan. 7, 2003 as U.S. Pat. No. 6,504,131; Welding-Type System With Robot Calibration, Rappl et al., filed Sep. 19, 2001, application Ser. No. 09/956,501, which issued on Nov. 4, 2003 as U.S. Pat. Nos. 6,642,482; and 6,087,626, Hutchison, et al., Jul. 11, 2000, entitled Method and apparatus for welding. Each of these patents is hereby incorporated by reference.

Some such systems are used for short circuit (MIG) welding, a process where the arc alternates between a short and arc state. A wire electrode is mechanically fed into the weldment by a wire feeder in the short circuit transfer welding process. It is consumed into the weldment via a series of alternating short circuit and arc events. This process is generally referred to as short circuit welding, or short circuit transfer welding. Generally, a welding machine used for short circuit welding includes at least a power source, a controller and a wire feeder.

The short circuit transfer welding process is cyclical. One cycle of the process, as described herein, begins with the beginning of a steady state arc, followed by a short circuit condition, and is completed with the beginning of another steady state arc condition. A typical cycle length is 10 msec. The electrode, and a portion of the base metal, are melted during the short circuit transfer welding process by current flowing through the electrode to the weldment. Generally, a portion of the wire material melts during the arc condition, and is transferred during the short condition.

The event of clearing the short, i.e., the transition from a short circuit to an arc, may be the most violent portion of the process and can produce spatter. The explosive nature of this event has been reduced, by lowering the magnitude of the current prior to or at the short clearing, thereby limiting the power density. Some prior art short arc systems sensed the clearing, and then lowered the current magnitude. Better short arc systems, such as Miller RMD®, predict the short clearing, so the current can be lowered prior to the clearing. The RMD® prediction includes monitoring the second derivative of power.

Short circuits can occur unintentionally in pulse welding. In such situations it is desirable to clear the short in a way to avoid spatter. The prior art short clearing for pulse processes typically reduced the current after the voltage reached a specified threshold, indicating the process is back in an arc. However, clearing a short in this method tends to generate spatter.

Accordingly, a welding type system that performs welding and includes a way to predict the short clearing so that the current may be lowered prior to the short clearing is desirable.

SUMMARY OF THE PRESENT INVENTION

According to a first aspect of the invention a welding-type system provides a pulse output and includes a controller with a module that predicts the clearing of an unintentional or intentional short. Preferably the prediction uses the second derivative of voltage with respect to time ($d^2v/dt^2$), or uses the first derivative to calculate a predicted value of the output voltage, and then compares a function of the predicted value, such as adding an offset, or multiplying it by a percent greater than 100%, to an actual value, and when the actual value exceeds the function of the predicted value, determines that the short is about to clear.

According to a second aspect of the invention a method of welding includes providing power to a welding arc and monitoring the voltage of the arc to determine when the arc becomes a short, based on the voltage. The output voltage is monitored during the short and a first derivative of the output voltage is determined. A predicted output voltage is calculated from the first derivative and added to an offset or multiplied by a percent greater than 100%. The predicted output voltage, the output voltage and an offset (or the multiplied predicted value and the output voltage) are compared. The short is predicted to clear when the output voltage exceeds the predicted output voltage by the offset (or when the output voltage exceeds the multiplied predicted voltage). The output current is decreased, in response to predicting that the short is about to clear.

According to a third aspect of the invention a method of welding includes providing power to a welding arc and monitoring the voltage of the arc to determine when the arc becomes a short, based on the voltage. The output voltage is monitored during the short and a second derivative of the output voltage is determined and compared to a threshold. The short is predicted to clear in response to the comparison, and an output current is decreased in response to predicting that the short is about to clear.

According to various alternatives the short clearing prediction module further compares either the first derivative of the feedback signal or the feedback signal to a second threshold, and determines that the short has cleared when the threshold is crossed. Thus, the clearing is detected by the first of the threshold or the predicted value comparison that is met.

The offset value is between 101 and 103 percent of the feedback signal in one embodiment, and is adaptively changed in other embodiments.

Other principal features and advantages of the invention will become apparent to those skilled in the art upon review of the following drawings, the detailed description and the appended claims.

Figure 1:
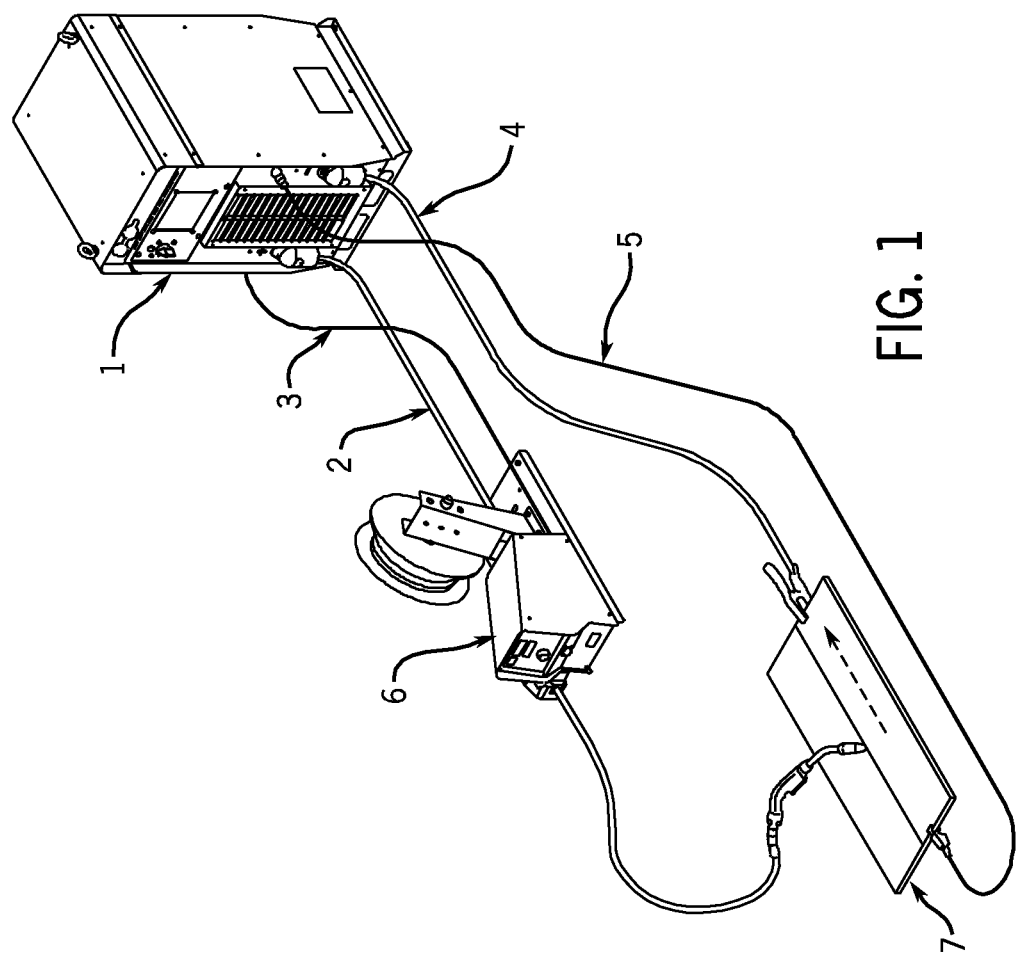
FIG. 1 is a welding-type system in accordance with the preferred embodiment of the present invention.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular welding-type system it should be understood at the outset that the invention can be implemented in other welding-type systems, performing other processes.

The preferred embodiment provides for implementing the invention with the Miller Axcess E® welding power supply, used in a pulse or RMD® (short circuit) mode. However, the invention can be implemented with other power supplies and used in any welding process with intentional or unintentional (or both) shorts. The welding-type system includes a control module with an short clearing prediction module. Module, as used herein, includes software and/or hardware that cooperates to perform one or more tasks, and can include digital commands, control circuitry, power circuitry, networking hardware, etc.

A short clearing prediction module is a module that monitors arc/short or output parameters and determines that the short will clear in the near future. Preferably the modules predicts the clearing 200 μs or more prior to the clearing. This allows the process to remove the current or bring it to a very low level prior to clearing. Lowering the current magnitude in response to the short clearing prediction module determining that the short will clear in the near future—i.e., before the short clears—reduces or avoids spatter.

The module resides as software in a microprocessor, dsp, FPGA, or other digital circuit, and related hardware in the welding-type system controller, in the preferred embodiment, but can be outside the controller and/or implemented with analog and/or digital circuitry in other embodiments. The preferred embodiments provides that the prediction module is software based to reduce hardware costs and allows the module to be changed relatively easily if desired.

The time it takes to sense an impending short, and to command the current to be reduced can be called a propagation delay because this is the time it takes for the feedback and decision to propagate through the system. The propagation delay can be affected by the particular microprocessor (or DSP, FPGA, analog circuitry, etc) used, as well as the sampling rate and the number of data samples needed to make a determination that the short is about to clear. There is also a response time delay between the time the system commands the current to be lowered, and the time the system responds to the command and the current has been lowered as commanded. The control can account for such delays by requiring the prediction to be made earlier. However, earlier predictions can result in errors, or result in lowering the current unnecessarily for whisker shorts.

The short clearing prediction module predicts the short clearing, on a short by short basis, by measuring the rate of change of voltage at the start of the short clear, and looking for a deviation from the anticipated or predicted dv/dt, i.e., the second derivative of voltage with respect to time, or $d^2v/dt^2$.

The second derivative of voltage with respect to time is used because as current is increased during a short (which clears the short), the voltage increases fairly linearly (since ohms law is V=current*resistance). The rate of change of the voltage is determined by how well the short touches the puddle or weldment (the amount of contact area, force, etc. affect the resistance). From one short to the next, the rate of change of the voltage (the first derivative, or slope or ramp rate) may change (since the wire is shorted better or worse than the previous short), but within one short it is generally linear until the short begins to clear.

As the short clears the resistance changes, this generates a non-linear response, i.e, a given current change results in a greater voltage change since the resistance is increasing. This means the slope (or rate) of the ramp is changing. The preferred embodiment uses the non-linear voltage response to predict when a short will clear. The short clearing prediction module determines what an expected voltage is, based on the initial rate, initial voltage, and time in the short. When the actual voltage exceeds the expected voltage by given amount, the short clearing prediction module predicts the short will clear. The given amount is a percentage of the predicted value in the preferred embodiment, and the expected voltage is multiplied by a percent greater than 100. This essentially looks for $d^2v/dt^2$ (the second order time derivative of voltage). The percentage is preferably less than 110% and more preferably between 101-103%, although any percentage may be used that provides a useful prediction. Thus, for example, the expected value could be multiplied by 1.02, and when the actual voltage exceeds 1.02 multiplied by the expected value, the short is predicted to clear. Other functions of the expected value can be used in the comparison. For example, adding a 2% offset to the expected value is the same as multiplying by the expected value. Alternatives include the short clearing prediction module using the second or higher order time derivative of power or resistance instead of or with voltage, or combinations thereof.

Welding system 100 performs generally as prior art pulse welding systems, but includes a short clearing prediction module that is used to reduce current before the short clears. Alternatives provide for using the short clearing prediction module in other processes where short circuits can occur such as short arc, MIG, etc. Various embodiments provide for using the short clearing prediction in pulse, or a combination of RMD and pulse, or in a standard short circuit process (CV controlled) to reduce spatter by predicting when a short will clear. Other embodiments provide for enhanced starting and stopping of the welding process by reducing the spatter from shorts created when the process is started or stopped.

Figure 2:
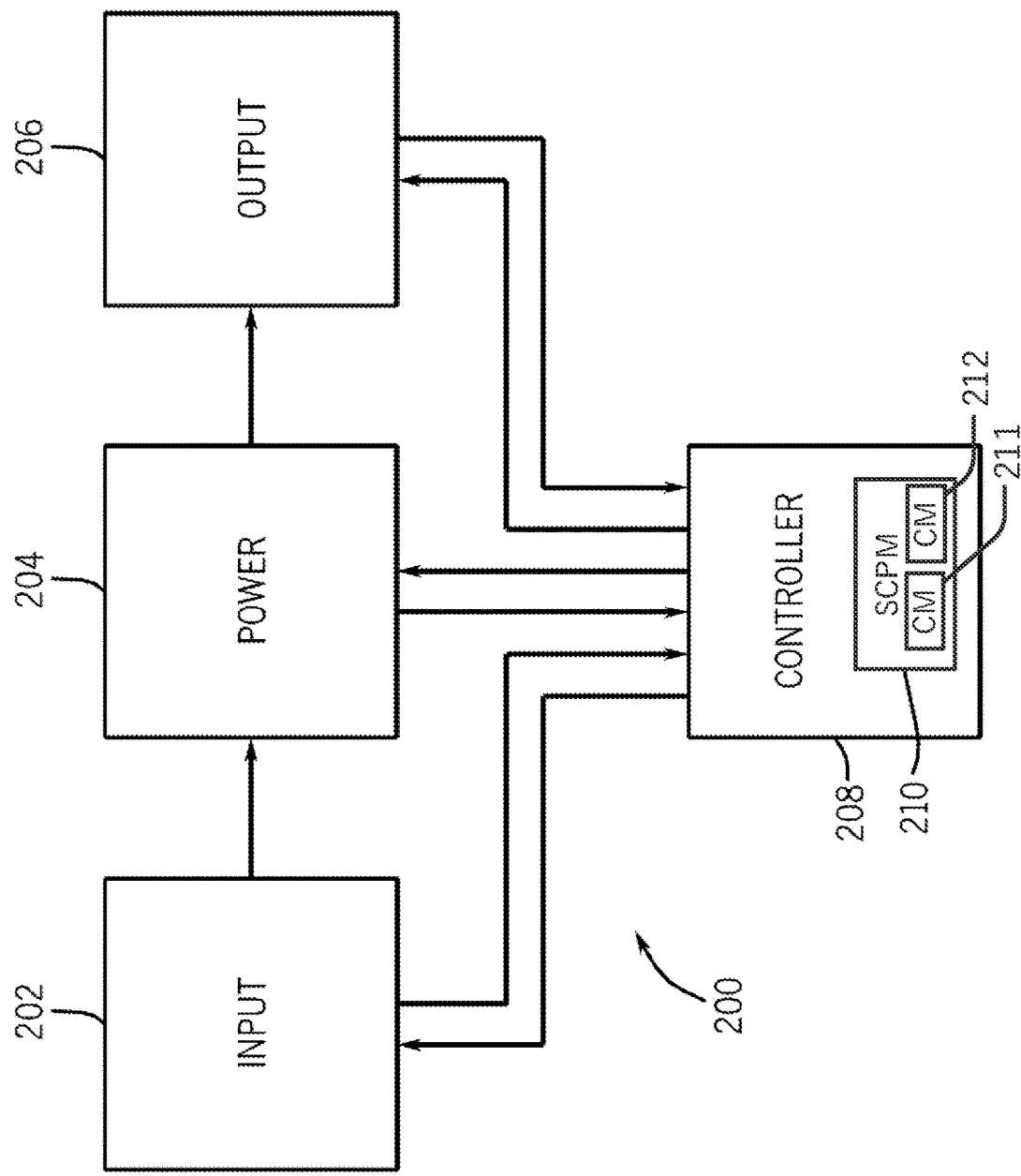
FIG. 2 is block diagram in accordance with the preferred embodiment of the present invention.

Referring now to FIG. 2, a diagram shows a welding-type system 200 includes an input circuit 202, a power circuit 204, and an output 206, as well as a controller 208. Circuits 202, 204 and 206, and controller 208, are part of welding power supply 1 (FIG. 1) in the preferred embodiment. They are distributed over several locations (such as wire feeder 6, an external control circuit, etc.) in other embodiments. Circuits 202, 204 and 206, and controller 208 are functional blocks and need not be physically distinct circuits.

Circuits 202, 204 and 206, are, in one embodiment, consistent with those shown in U.S. Pat. No. 6,329,636, entitled Method And Apparatus For Receiving A Universal Input Voltage In A Welding, Plasma Or Heating Power Source, issued Dec. 11, 2001, which is hereby incorporated by reference. Accordingly, circuits 202, 204 and 206 may include circuitry to rectify, boost, power factor correct, invert and transform different input powers into welding-type power.

Controller 208 includes much of the control circuitry of the prior art, including that used to turn switches on and off circuits 202, 204 and 206. This switch control circuitry can be implemented with other control circuitry, including digital, analog, and include micro processors, DSPs, analog circuitry, etc. Also, controller 208 preferably includes circuitry to monitor and/or log operating date.

In accordance with the invention a short clearing prediction module 210 is provided in controller 208. Other embodiments provide that module 210 is not part of controller 208, and/or outside of welding-type system 100, and/or module 210 is used with other processes.

In operation module 210 is provided feedback indicative of the output or arc/short voltage (the feedback may be output voltage, arc/short voltage, or responsive to arc/short or output voltage). This feedback can be used to determine when a short occurs (by the voltage dropping below a threshold, or by using another parameter), and/or to predict when the short will clear (using voltage or other parameters). Preferably, module 210 determines the initial slope of the voltage (rate of change of voltage over time, or first derivative of voltage). Module 210 calculates an expected voltage based on the ramp slope and the time in the short. When the actual voltage exceeds the expected voltage by more than a offset (preferably a percentage), short clearing prediction module 210 provides a signal that the short is about to clear. Mathematically, the offset can be added to the predicted value, subtracted from the actual voltage, multiplied by/divided into either, or a combination thereof, and obtain the same result. Thus, the prediction is based on the second time derivative of voltage, because it compares the change in voltage slope to a threshold.

Circuitry and/or software, that is or is not within short clearing prediction module 210 causes the current to decrease. The decrease can be consistent with the decrease in the prior art upon detection of or prediction of a short clearing.

Alternatives provide one or more comparators or comparator modules 211, 212 (e.g. of the short clearing prediction module 210) for monitoring other parameters, such as power, current or resistance, calculating the second derivative directly and compare it to a threshold (rather than comparing the change in slope to a percent change in slope), and/or having a threshold that is something other than a percentage of the initial slope (a fixed amount, proportional to a function—square, square root, log, etc.—of the initial slope, etc). The monitored parameter may be used to make the comparison to a threshold rather than voltage, dv/dt or the second derivative.

Figure 3:
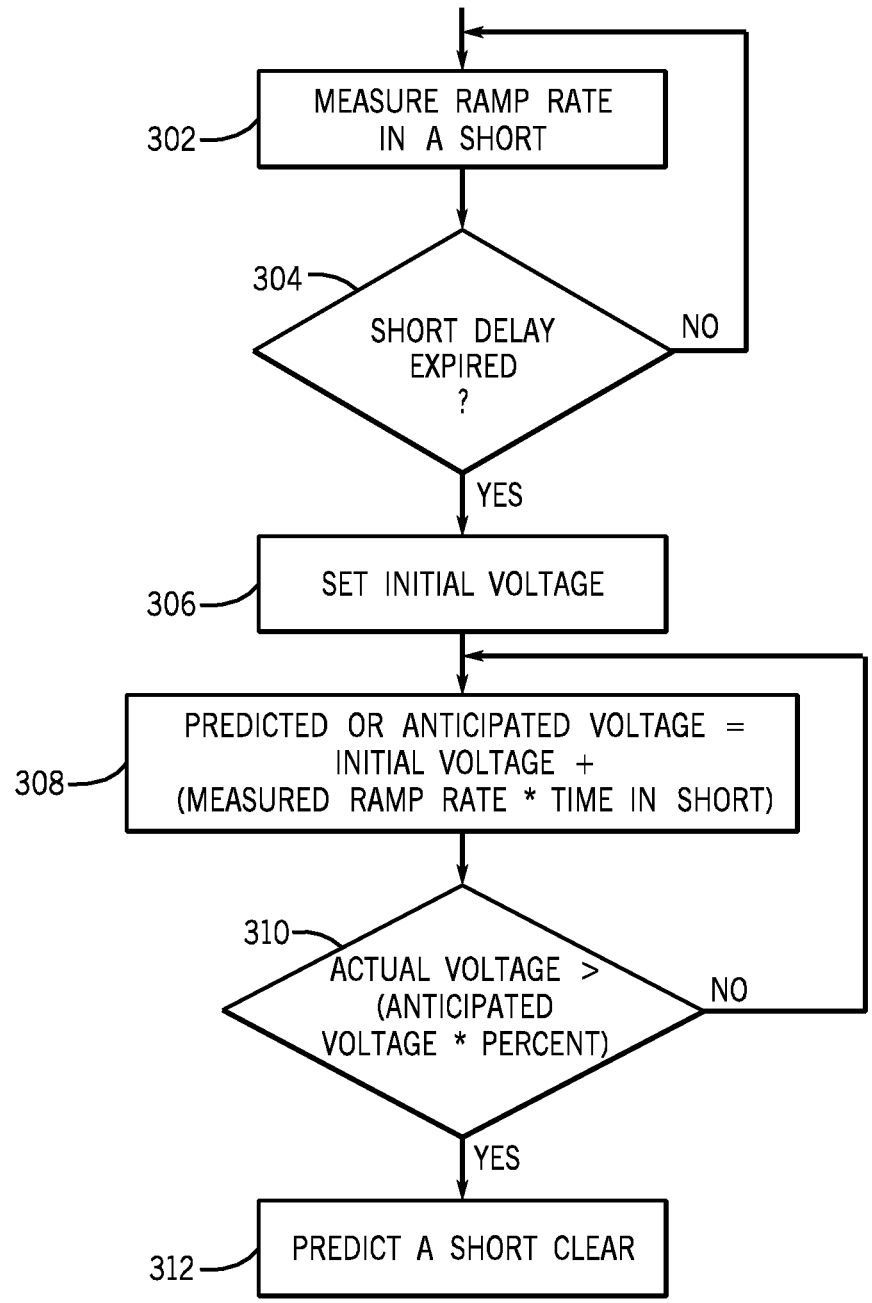
FIG. 3 is flow chart of an algorithm to predict a short clearing in accordance with a preferred embodiment of the present invention.

Referring now to FIG. 3, a flow chart that implements short clearing prediction module begins at block 302 where the ramp rate (slope) of the voltage is measured. A delay is provided at block 304, to allow the initial ramp to be recorded after the short is fully established. After the delay has expired, the initial voltage is set at block 306. The minimum delay, in the preferred embodiment is 16 samples at 80 KHz, or 200 µs. A typical delay, in the preferred embodiment is between 300 and 500 µs, which should allow the voltage to stabilize to the new ramp rate. The delay can be programmable, and can depend on the particular one wire and gas combination being used. During the delay time whisker shorts can clear on their own accord, and do not require reduced current to avoid spatter.

Then, the anticipated or predicted voltage is set as the initial voltage (measured at block 306) plus the ramp rate measured in block 302 multiplied by the time in the short. This gives the voltage expected if the ramp is linear—i.e. before the short begins to clear. The actual voltage is compared to the anticipated or predicted voltage multiplied by a percentage at block 310. The percentage can be changed in an adaptive process where if the short clears before or after it was predicted to clear, the percentage is adjusted accordingly to move the predicted clearing closer in time to the actual clearing (i.e, lowering the percentage causes the short being predicted to clear earlier in time, and increasing the percentage results in the short being predicted to clear later in time).

Figure 4:
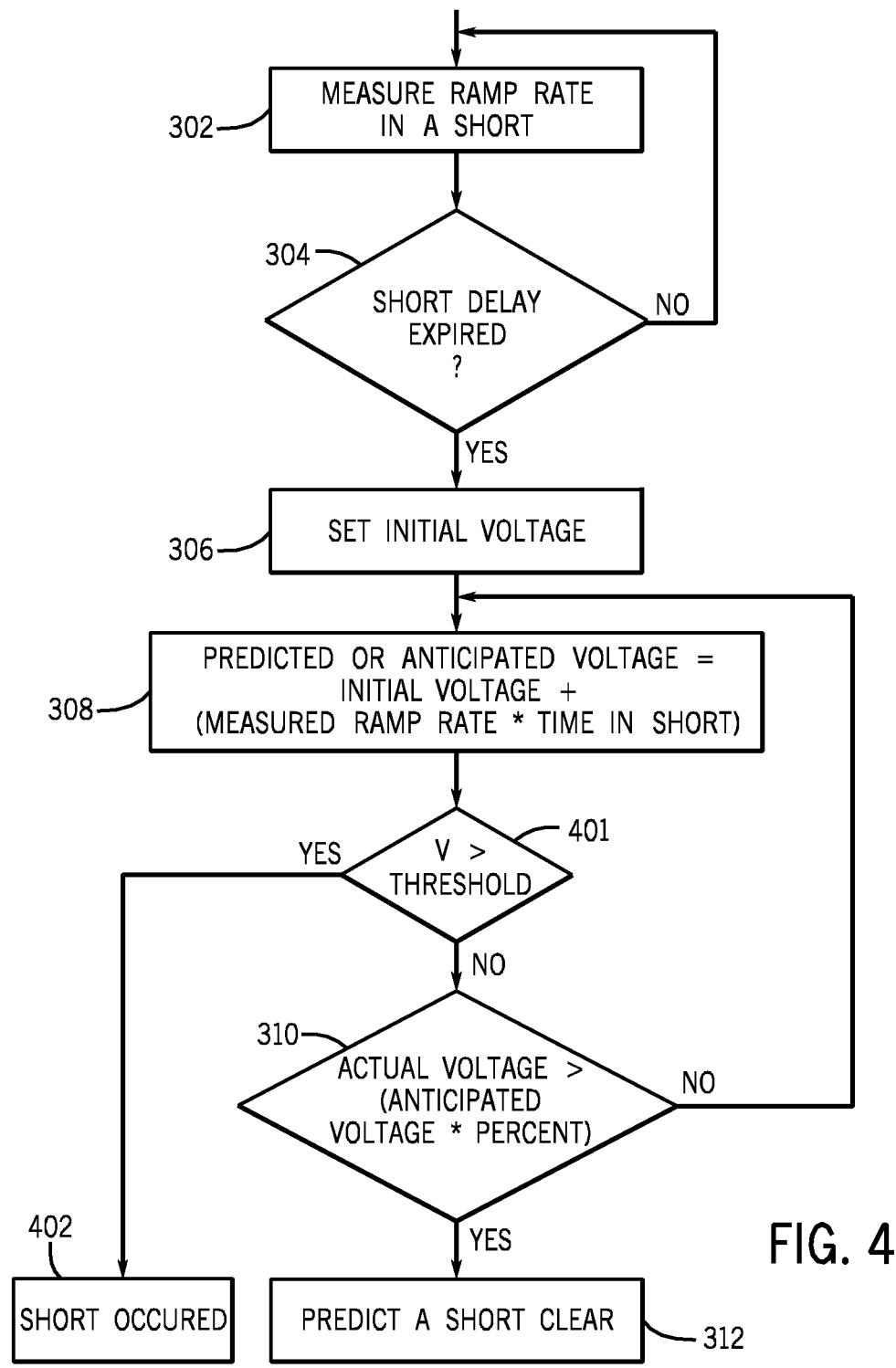
FIG. 4 is flow chart of an algorithm to predict a short clearing in accordance with a preferred embodiment of the present invention.

If the actual voltage does not exceed the anticipated or predicted voltage by the percentage, then the algorithm returns to block 308 because the short is not about to clear. If the actual voltage exceeds the anticipated or predicted voltage by the percentage, then the algorithm moves to block 312, and predicts the short will clear. Variations include varying the percentage, using a parameter other than voltage, and/or using a function of the ramp or measured voltage other than the percentage. One embodiment provides for comparing a measured actual voltage or a calculated dv/dt to a threshold, and if the measured or calculated value exceeds the threshold, then determines that the short has cleared. This shown in FIG. 4 as second comparator or comparator module 212 or blocks 401 and 402. The thresholds can be changed in an adaptive process where if the short clears before or after it was predicted to clear, the threshold is adjusted accordingly to move the predicted clearing closer in time to the actual clearing.

The module and method can be used with short-arc welding, pulsed welding, combinations thereof, or any welding process or combination that has intentional or unintentional shorts.

Various alternatives provide that welding-type system 100 includes network communication, such as WAN, LAN, over power lines, over a smart grid, and that the data transmitted and/or stored, such as on a USB drive, include arc parameters and primary information, such as harmonics data, utilization data, etc. The information can be shared over the network or using a drive with end users, power companies, manufacturers that use welders, manufactures that supply welders, etc. Additionally, various alternatives and arrangements are shown in the attached appendix.

Numerous modifications may be made to the present invention which still fall within the intended scope hereof. Thus, it should be apparent that there has been provided in accordance with the present invention a method and apparatus for a welding-type system with short clearing prediction module that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A welding-type system, comprising:
   a power supply with a control input; and
   a controller, wherein the controller includes a short clearing prediction module that receives a feedback signal responsive to an output voltage, and determines a second derivative of the feedback signal, and a first comparator that compares the second derivative to a threshold, and wherein the short clearing prediction module determines that the short is about to clear when the first comparator determines that the second derivative exceeds or equals the threshold, and wherein the controller provides a signal to the control input, causing an output current to decrease, in response to the short clearing prediction module determining that the short is about to clear.

2. The welding-type system of claim 1, wherein the short clearing prediction module further includes a second comparator that compares a first derivative of the feedback signal or the feedback signal to a second threshold, and wherein the short clearing prediction module determines that the short has cleared when the first comparator determines that the one of the first derivative of the feedback signal and the feedback signal exceeds or equals the second threshold, and wherein the controller provides a signal to the control input, causing an output current to decrease, in response to the short clearing prediction module determining that the short is about to clear.

3. The welding-type system of claim 2, wherein the first derivative of the feedback signal is the one of the first derivative of the feedback signal and the feedback signal.

4. The welding-type system of claim 2, wherein the feedback signal is the one of the first derivative of the feedback signal and the feedback signal.

5. The welding-type system of claim 1, wherein the controller changes the threshold based on a past difference between a time the short actually clears and a time the short is predicted to clear.

6. The welding-type system of claim 2, wherein the first comparator is not enabled until a delay after a short is formed.

7. The welding-type system of claim 6, wherein the delay is between 200 microseconds and 500 microseconds.

8. A method of welding, comprising:
   providing power to a welding arc;
   monitoring arc voltage of the welding arc, and determining when the welding arc becomes a short, based on arc voltage;
   monitoring output voltage during the short;
   determining a second derivative of the output voltage;
   comparing the second derivative of the output voltage to a threshold;
   predicting that the short is about to clear when the second derivative of the output voltage exceeds or equals the threshold; and
   causing an output current to decrease, via a short clearing prediction module, in response to predicting that the short is about to clear.

* * * * *